(12) United States Patent
Hamzy et al.

(10) Patent No.: US 7,509,262 B2
(45) Date of Patent: Mar. 24, 2009

(54) WEIGHT BASED UPSELLING

(75) Inventors: Mark Joseph Hamzy, Round Rock, TX (US); Edward Scott Rozmiarek, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 866 days.

(21) Appl. No.: 10/981,265

(22) Filed: Nov. 4, 2004

(65) Prior Publication Data

US 2006/0095354 A1  May 4, 2006

(51) Int. Cl.
*G06Q 99/00* (2006.01)

(52) U.S. Cl. ............................. 705/1; 705/27; 705/35; 705/37; 705/401

(58) Field of Classification Search ............ 705/1, 705/26–27, 400, 37, 401, 35
See application file for complete search history.

(56) References Cited

U.S. PATENT DOCUMENTS

| | | | |
|---|---|---|---|
| 6,269,343 B1 * | 7/2001 | Pallakoff | 705/26 |
| 7,136,830 B1 * | 11/2006 | Kuelbs et al. | 705/27 |
| 2002/0010634 A1 * | 1/2002 | Roman et al. | 705/26 |
| 2002/0077960 A1 * | 6/2002 | Kiely et al. | 705/37 |
| 2002/0143660 A1 | 10/2002 | Himmel et al. | |
| 2002/0156699 A1 * | 10/2002 | Gray et al. | 705/26 |
| 2003/0074278 A1 | 4/2003 | Keohane et al. | |
| 2003/0076736 A1 * | 4/2003 | Buker et al. | 366/132 |
| 2003/0103897 A1 | 6/2003 | Green | |
| 2003/0105682 A1 | 6/2003 | Dicker et al. | |
| 2004/0093311 A1 * | 5/2004 | Chew et al. | 705/401 |
| 2004/0243485 A1 * | 12/2004 | Borenstein et al. | 705/27 |
| 2005/0119966 A1 * | 6/2005 | Sandholm et al. | 705/37 |

FOREIGN PATENT DOCUMENTS

WO  WO 9843149 A2 * 10/1998

OTHER PUBLICATIONS

Berger, Richard, "Optimizing interaction : Online Cross- Selling and Upselling", Apr. 2001, Customer Interaction Solutions, 19, 10, 44 (5 pgs).*
Miller et al. , "The Price of Free S&H", Oct. 2002, Catalog Age, p. 1, (4 pgs).*
Barry, Curt, "Software", Sep. 1, 2000, Multichannel Merchant, 4 pgs.*

* cited by examiner

*Primary Examiner*—John W. Hayes
*Assistant Examiner*—Freda A. Nelson
(74) *Attorney, Agent, or Firm*—John Biggers; Matthew Talpis; Biggers & Ohanian LLP.

(57) ABSTRACT

Weight based upselling, including receiving a purchase request for an item from a customer; determining a weight of the item; identifying, in dependence upon the weight of the item, a shipping weight range and a shipping cost for the item, where the shipping weight range includes a maximum shipping weight; calculating a difference between the weight of the item and the maximum shipping weight in the shipping weight range; selecting an upsell item in dependence upon the difference between the weight of the item and the maximum shipping weight in the shipping weight range; and offering the upsell item to the customer, including offering to ship both the item and the upsell item for only the identified shipping cost.

8 Claims, 5 Drawing Sheets

WEIGHT BASED UPSELLING

BACKGROUND OF THE INVENTION

1. Field of the Invention

The field of the invention is data processing, or, more specifically, methods, systems, and products for weight based upselling.

2. Description of Related Art

Online shopping on the Internet and the World Wide Web has become commonplace. Customers have become accustomed to price shopping to get the best deal on the products they buy. Other than picking the method of shipping (ground, second day, next day, and so on), customers generally do not think of minimizing the shipping costs when ordering. In fact, many shippers will charge a flat rate for package up to a certain amount of weight. If the package weights less than the maximum weight allowed for the flat rate, this extra shipping space is wasted and the customer's effectively overpays the shipping cost for an order.

SUMMARY OF THE INVENTION

Methods, systems, and products are disclosed for weight based upselling that reduce the risk of wasting shipping costs by offering a customer an additional purchase of an item whose weight can be included in the unused portion of the shipping cost—so that the item can be shipped to the customer at no additional cost for the shipping. That is, methods, systems, and products are disclosed for weight based upselling that include receiving a purchase request for an item from a customer; determining a weight of the item; identifying, in dependence upon the weight of the item, a shipping weight range and a shipping cost for the item, where the shipping weight range includes a maximum shipping weight; calculating a difference between the weight of the item and the maximum shipping weight in the shipping weight range; selecting an upsell item in dependence upon the difference between the weight of the item and the maximum shipping weight in the shipping weight range; and offering the upsell item to the customer, including offering to ship both the item and the upsell item for only the identified shipping cost.

In typical embodiments, receiving a purchase request for an item includes receiving a purchase request in an electronic commerce server through an electronic data communications medium, and offering the upsell item to the customer includes offering the upsell item to the customer from the electronic commerce server through the electronic data communications medium. In other embodiments, receiving a purchase request for an item includes receiving a purchase request for an item by telephone, and offering the upsell item to the customer includes offering the upsell item to the customer by telephone. In typical embodiments, the purchase request includes an item identifier. In such embodiments, determining a weight of the item includes selecting an item record in dependence upon the item identifier and reading the weight of the item from the item record. In such embodiments, the item record typically includes data elements describing the item, including the weight of the item.

In typical embodiments, selecting an upsell item in dependence upon the difference between the weight of the item and the maximum shipping weight in the shipping weight range also includes selecting an upsell item having a weight not greater than the difference between the weight of the item and the maximum shipping weight in the shipping weight range. In typical embodiments, selecting an upsell item in dependence upon the difference between the weight of the item and the maximum shipping weight in the shipping weight range also includes selecting an upsell item having a weight not greater than the difference between the weight of the item and the maximum shipping weight in the shipping weight range and a type code matching a type code associated with the item. In typical embodiments, selecting an upsell item in dependence upon the difference between the weight of the item and the maximum shipping weight in the shipping weight range also includes selecting an upsell item having a weight not greater than the difference between the weight of the item and the maximum shipping weight in the shipping weight range and at least one demographic code matching at least one demographic code associated with the customer. In typical embodiments, selecting an upsell item in dependence upon the difference between the weight of the item and the maximum shipping weight in the shipping weight range also includes selecting an upsell item having a weight not greater than the difference between the weight of the item and the maximum shipping weight in the shipping weight range; and an item type matching an item type associated with the customer through a purchase history.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Introduction

The present invention is described to a large extent in this specification in terms of methods for weight based upselling. Persons skilled in the art, however, will recognize that any computer system that includes suitable programming means for operating in accordance with the disclosed methods also falls well within the scope of the present invention. Suitable programming means include any means for directing a computer system to execute the steps of the method of the invention, including for example, systems comprised of processing units and arithmetic-logic circuits coupled to computer memory, which systems have the capability of storing in computer memory, which computer memory includes electronic circuits configured to store data and program instructions, programmed steps of the method of the invention for execution by a processing unit.

The invention also may be embodied in a computer program product, such as a diskette or other recording medium, for use with any suitable data processing system. Embodiments of a computer program product may be implemented by use of any recording medium for machine-readable information, including magnetic media, optical media, or other suitable media. Persons skilled in the art will immediately recognize that any computer system having suitable programming means will be capable of executing the steps of the method of the invention as embodied in a program product. Persons skilled in the art will recognize immediately that, although most of the exemplary embodiments described in this specification are oriented to software installed and executing on computer hardware, nevertheless, alternative embodiments implemented as firmware or as hardware are well within the scope of the present invention.

Weight Based Upselling

Figure 1:
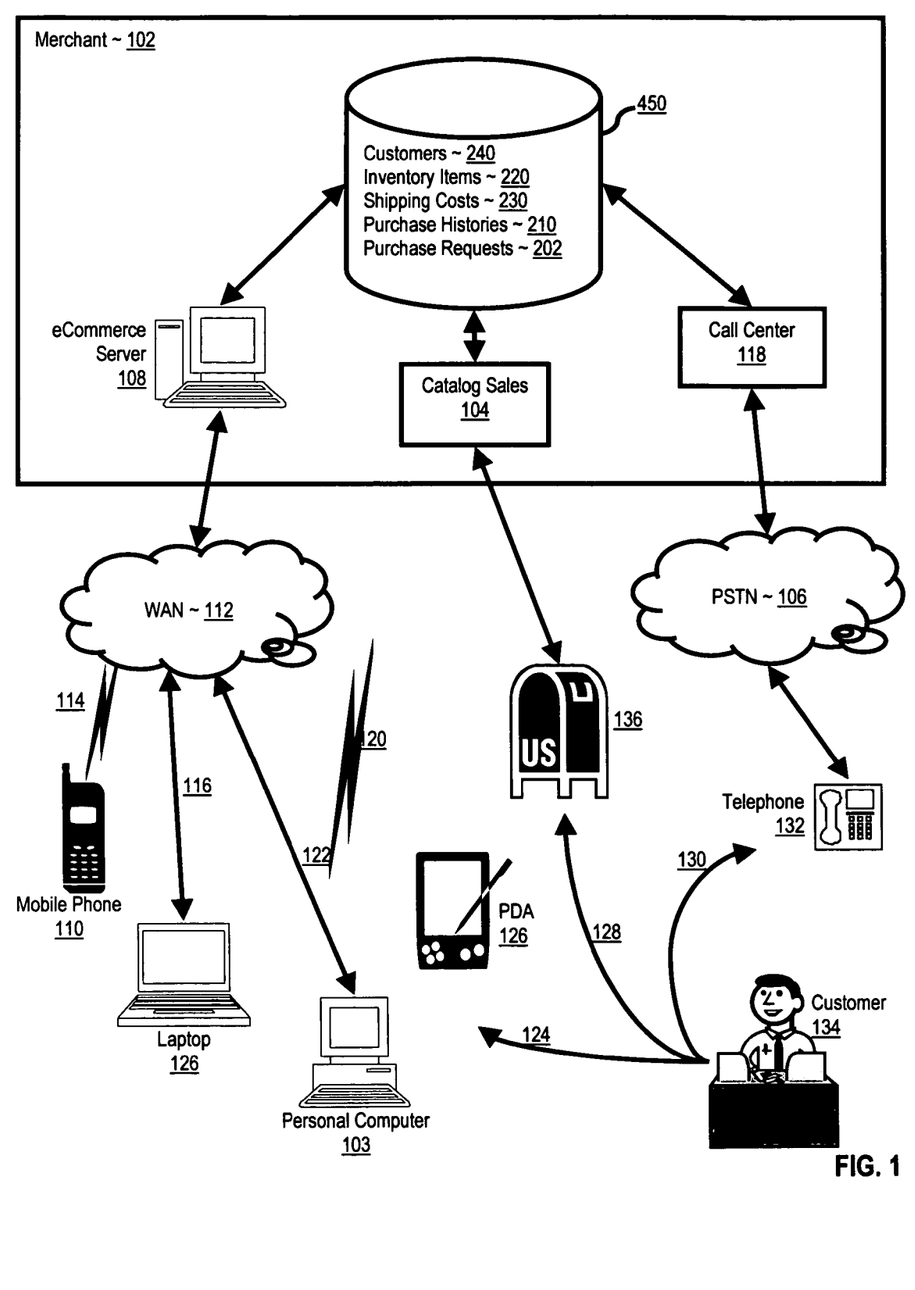
FIG. 1 sets forth a diagram illustrating a system for weight based upselling according to embodiments of the present invention.

Methods, systems, and products for weight based upselling are described with reference to the accompanying drawings, beginning with FIG. 1. FIG. 1 sets forth a diagram illustrating a system for weight based upselling according to embodiments of the present invention. Weight based upselling is offering a second item for sale to a customer who has issued a purchase request for a first item when the second item has a weight not greater than the difference between the weight of the first item and the maximum shipping weight in a shipping weight range for the same cost. That is, weight based upselling is offering a second item for sale with no addition to the shipping costs; the second item ships for free, with its shipping costs effectively included in the shipping cost for the first item because adding the second item to the order does not increase the overall weight into another shipping cost level. The weight of the second item is added to the shipment weight of the first item without increasing the shipping cost.

The system of FIG. 1 includes a merchant (102) that operates generally to receive a purchase request for an inventory item from a customer (134); determine a weight of the item; identify, in dependence upon the weight of the item, a shipping weight range and a shipping cost for the item, where the shipping weight range includes a maximum shipping weight; calculate a difference between the weight of the item and the maximum shipping weight in the shipping weight range; select an upsell item in dependence upon the difference between the weight of the item and the maximum shipping weight in the shipping weight range; and offer the upsell item to the customer, including offering to ship both the item and the upsell item for only the identified shipping cost.

Figure 4:
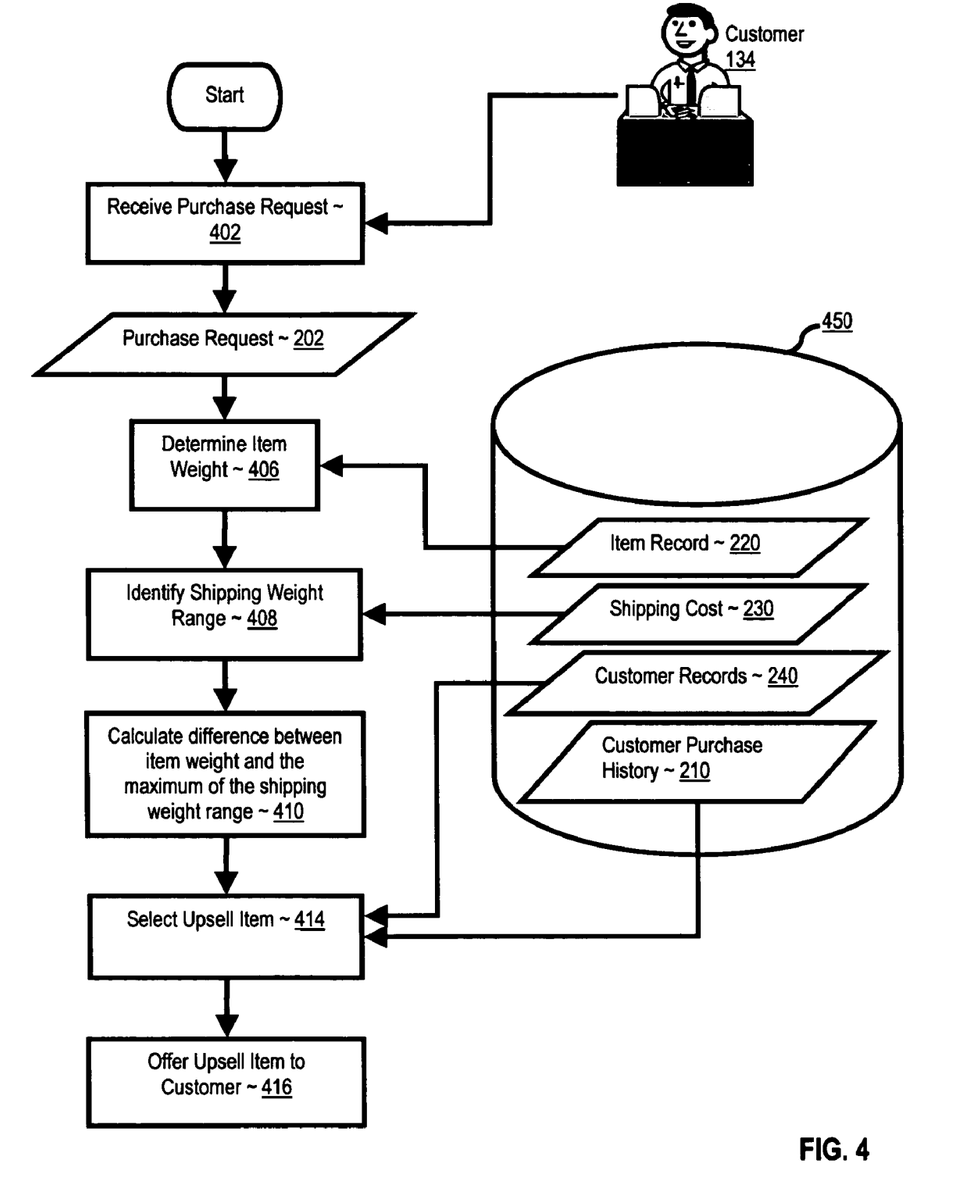
FIG. 4 sets forth a flow chart illustrating a method for weight based upselling.

In the system of FIG. 4, purchase requests (202) and inventory items (220) are represented as information in a data store (450). Inventory items are generally referred to in this specification as 'items' and can be anything subject to commercial sales, goods, services, leases, parcels of real estate, stocks and bonds, and so on, as will occur to those of skill in the art.

The merchant may receive purchases requests in electronic form, as paper purchase forms forwarded through the mail, by telephone, and in other ways as will occur to those of skill in the art.

In the system of FIG. 1, a merchant (102) may receive a purchase request (202) for an item by receiving a purchase request in an electronic commerce server (108) through an electronic data communications medium (112). In the system of FIG. 1, an electronic purchase request may originate with a customer (134, 124) who enters a purchase request through a computer that supports a data communications client such as, for example, a browser. An electronic purchase request can then be implemented as a markup document expressed in a markup language and communicated electronically according to data communications protocols from a client computer to an ecommerce server (108) in the merchant (102). Examples of client computers operable in systems for weight based upselling according to embodiments of the present invention in the system of FIG. 1 include:

- a mobile telephone (110) connected for electronic data communications to ecommerce server (108) in merchant (102) through wireless connection (114) and Wide Area Network ('WAN') (112);
- a laptop computer (126) connected for electronic data communications to ecommerce server (108) in merchant (102) through wire line connection (116) and Wide Area Network ('WAN') (112);
- a personal computer (103) connected for electronic data communications to ecommerce server (108) in merchant (102) through wire line connection (122) and Wide Area Network ('WAN') (112); and
- a personal digital assistant ('PDA') (126) connected for electronic data communications to ecommerce server (108) in merchant (102) through wireless connection (120) and Wide Area Network ('WAN') (112).

Markup languages useful to implement purchase requests in electronic form in systems for weight based upselling according to embodiments of the present invention include, for example, the HyperText Markup Language ('HTML'), the Wireless Markup Language ('WML'), and the extensible Markup Language ('XML'). Data communications protocols useful to transmit purchase requests in electronic form from client computers to ecommerce servers in systems for weight based upselling according to embodiments of the present invention include, for example, the HyperText Transfer Protocol ('HTTP'), the Wireless Access Protocol ('WAP'), the Transmission Control Protocol ('TCP'), and the Internet Protocol ('IP').

In the system of FIG. 1, merchant (102) may receive a purchase request as a paper purchase form forwarded (128) from a customer (134) through the ordinary mail (136) to a catalog sales department (104). In the system of FIG. 1, merchant (102) may receive a purchase request for an item by telephone (130, 132) through a Public Switched Telephone Network ('PSTN') (106) in a call center (118), for example. Merchant employees in the catalog sales department (104) and in the call center (118) have computer workstations connected to the data store (450) so that the merchant's employees may store and retrieve information regarding purchase requests, inventory items, customers, and so on.

The merchant of FIG. 1 may select an upsell item and offer the upsell item to the customer, including offering to ship both the item and the upsell item for only the identified shipping cost. Just as a merchant may receive a purchase according to the system of FIG. 1, electronically, by mail, or by phone, the merchant, having selected an upsell item, may offer the upsell item to the customer electronically, by mail, or by phone. That is, the merchant may offer an upsell item to a customer (134) from the electronic commerce server (108) through the electronic data communications medium (112). Alternatively, the merchant may offer the upsell item to the customer by telephone (132) from the call center (118).

Systems for weight based upselling according to embodiments of the present invention are generally implemented with automated computing machinery, that is, with computers. In the system of FIG. 1, for example, several principal components are represented primarily as computers, including client computers (110, 126, 103, 126), the ecommerce server (108), and the data store (450). For further explanation, therefore, FIG. 2 sets forth a block diagram of automated computing machinery comprising a computer (152) useful in systems for weight based upselling according to embodiments of the present invention.

Figure 2:
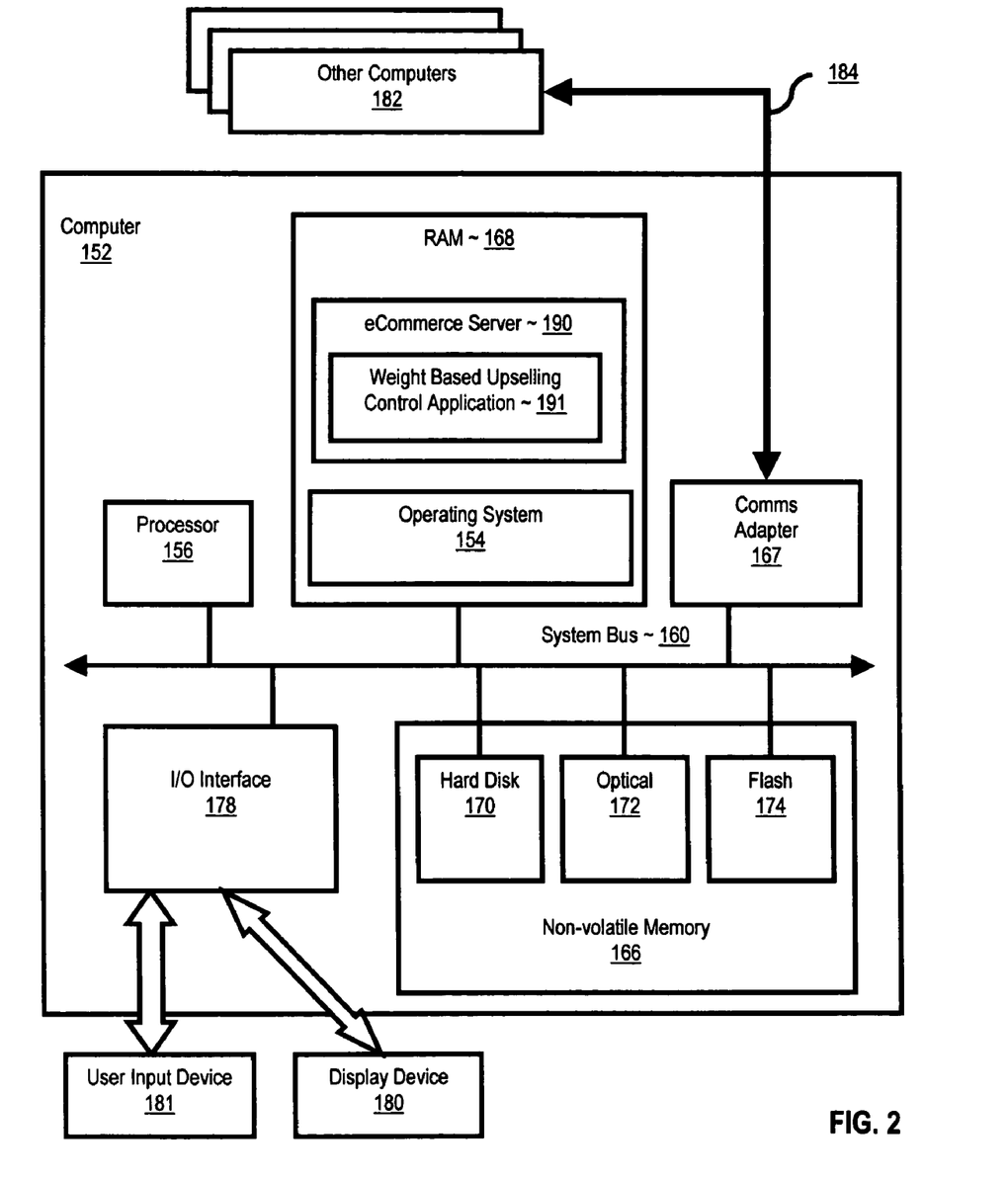
FIG. 2 sets forth a block diagram of exemplary automated computing machinery for weight based upselling.

The computer (152) of FIG. 2 includes at least one computer processor (156) or 'CPU' as well as random access memory (168) ("RAM"). Stored in RAM (168) is an ecommerce server (190) and a weight based upselling control application (191) which, taken together, represent an aggregation of computer instructions that carry out weight based upselling according to embodiments of the present invention. That is, the ecommerce server (190) and a weight based upselling control application (191) work together to receive a purchase request for an inventory item from a customer, determine the weight of the item, identify a shipping weight range and a shipping cost for the item, calculate the difference between the weight of the item and the maximum shipping weight, select an upsell item in dependence upon the difference, and offer the upsell item to the customer, including offering to ship both the item and the upsell item for only the identified shipping cost. Also stored in RAM (168) is an operating system (154). Operating systems useful in computers according to embodiments of the present invention include Unix™, Linux™, AIX™, Microsoft NT™, and many others as will occur to those of skill in the art. In the example of FIG. 2, the ecommerce server (190) and the weight based upselling control application (191), and the operating system (154) are shown in RAM (168), although many components of such software may also be stored in non-volatile memory (166).

The computer (152) of FIG. 2 includes non-volatile computer memory (166) coupled through a system bus (160) to processor (156) and to other components of the computer. Non-volatile computer memory (166) may be implemented as a hard disk drive (170), optical disk drive (172), electrically erasable programmable read-only memory space (so-called 'EEPROM' or 'Flash' memory) (174), RAM drives (not shown), or as any other kind of non-volatile computer memory as will occur to those of skill in the art. Non-volatile memory may be used to implement a memory store like the one at reference (450) on FIG. 1.

The exemplary computer (152) of FIG. 2 includes a communications adapter (167) for implementing connections for data communications (184), including connections through networks, to other computers (182), including, for example, the client computers of FIG. 1 (110, 126, 103, 126) and others as will occur to those of skill in the art. Communications adapters implement the hardware level of connections for data communications through which one computer sends data communications another computer, directly or through a network. Examples of communications adapters useful for weight based upselling according to embodiments of the present invention include modems for wired dial-up connections, Ethernet (IEEE 802.3) adapters for wired network connections, and 802.11b adapters for wireless network connections.

The example computer of FIG. 2 includes one or more input/output interface adapters (178). Input/output interface adapters in computers implement user-oriented input/output through, for example, software drivers and computer hardware for controlling output to display devices (180) such as computer display screens, as well as user input from user input devices (181) such as keyboards, mice, numeric keypads, and magnetic card readers.

A merchant may determine the weight of an item, identify a shipping weight range and a shipping cost for the item, calculate the difference between the weight of the item and the maximum shipping weight, and select an upsell item—all by use of the data store illustrated at reference (450) in FIG. 1.

Figure 3:
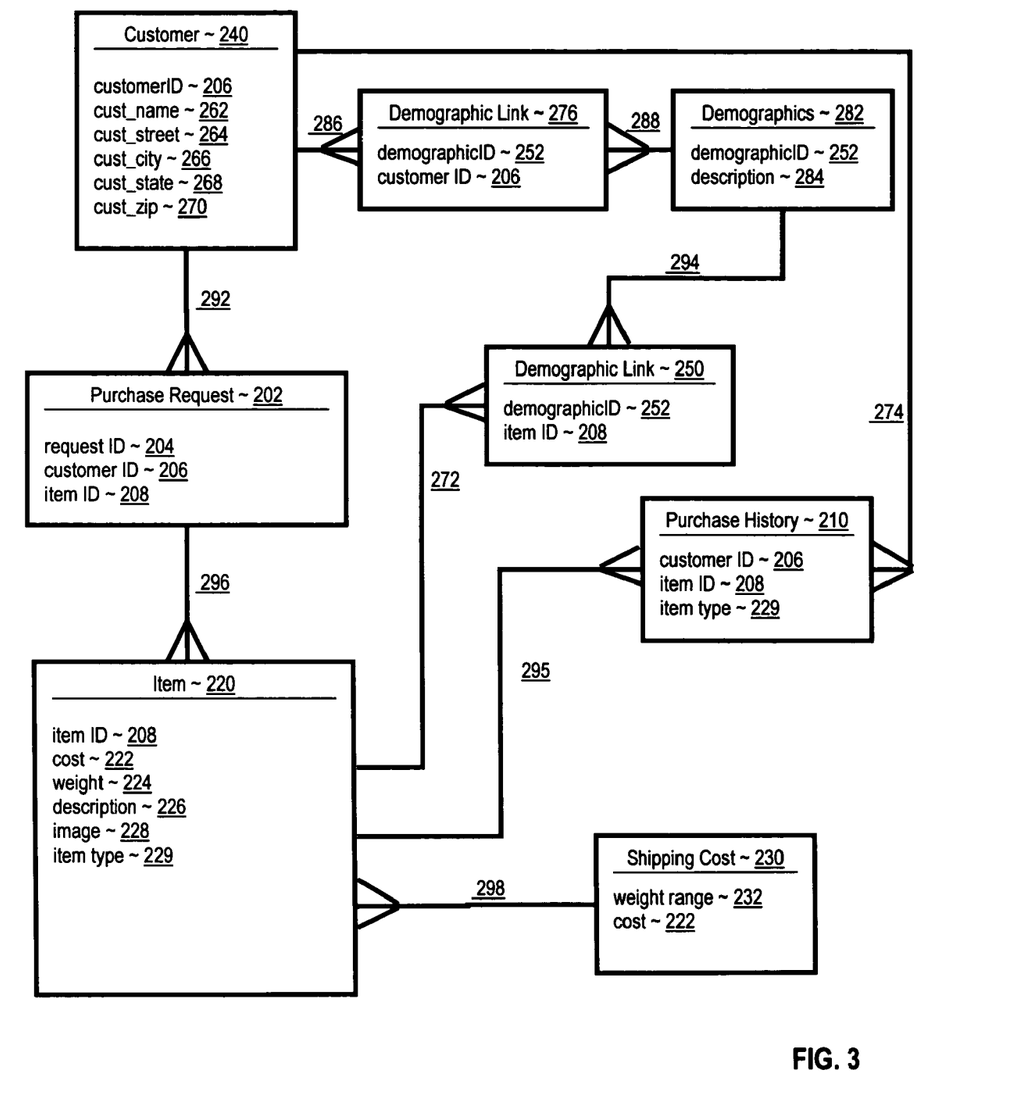
FIG. 3 sets forth a data structure diagram illustrating exemplary data structures and relations among them useful in systems for weight based upselling.

The data store may be used under automation by an ecommerce server or by use of queries entered manually through computer workstations on employees' desks in a catalog sales department or a call center. For further explanation, FIG. 3 sets forth a data structure diagram illustrating exemplary data structures and relations among them useful in systems for weight based upselling. The examples of FIG. 3 are for explanation only, not for limitation of the present invention. Many data structures and data models as will occur to those of skill in the art are useful in system for weight based upselling according to embodiments of the present invention.

The exemplary data structures of FIG. 3 include records representing purchase requests (202) each of which includes a request identification field (204) that includes a unique identification code uniquely identifying a particular purchase request, a customer identification field (206) that identifies the customer from whom the purchase request is received, and an item identification field (208) that identifies the inventory item to be purchased according to the purchase request. Related to the purchase request records (202) one-to-many (292) through the customerID field (206) operating as a foreign key, are customer records (240), each of which includes fields describing a customer such as, for example, a customer identification field (206) and customer name and address fields (262-270).

The exemplary data structures of FIG. 3 include records representing inventory items (220) each of which includes an item identification field (208), a price field (222), a weight field (224) that stores the weight of the item represented by an item record, a description field (226) for storing a text description of an item, an image field (228) for storing an image of an item or a pathname where an image of the item may be found, and an item type field (229) for storing values categorizing an item. Upon receiving a purchase request (202) that includes an item identifier, a merchant may determine the weight of the item further by selecting an item record (220) whose item ID (208) matches the item ID (208) in the purchase request (202) and reading the weight (224) of the item from the selected item record (220).

The exemplary data structures of FIG. 3 include records representing shipping costs (230) for shipping inventory items having weights in weight ranges. Each shipping cost record (230) includes a shipping cost (222) and a range of shipping weights (232) to which the shipping cost is applied. The range of shipping weights is characterized by a maximum shipping weight for the range. Having received a purchase request and determined the weight of the inventory item identified for purchase in the purchase request, a merchant may identify, in dependence upon the weight of the item, a shipping weight range and a shipping cost for the item by selecting a shipping cost record whose shipping weight range includes the weight of the item. The merchant may calculate the difference between the weight of the item and the maximum shipping weight in the shipping weight range and select an upsell item as one whose weight is not greater than that difference.

The exemplary data structures of FIG. 3 support selection of upsell items on the basis of type. That is, having received a purchase request and determined the weight of the inventory item identified for purchase in the purchase request, a merchant may select an upsell item not only for having a weight not greater than the difference between the weight of the item and the maximum shipping weight in the shipping weight range but also for having a type code (229) matching the type code associated with the inventory item identified in the purchase request. A request to purchase a book on home gyms, for example, having a weight in a shipping weight range that leaves room in the range for another book weighing somewhat less than the purchased book, may be selected as an upsell item because its type code (229) indicates that it too is a book about home exercise equipment.

The exemplary data structures of FIG. 3 include records representing purchaser demographics (282) each of which includes a demographic identification code (252) and a text description of a representative demographic (284). Demographics may include age, gender, occupation, zip code, income level, occupation, expressions of interest regarding inventory items or types of inventory items and others as will occur to those of skill in the art. In addition to the demographics records themselves, the exemplary data structures of FIG. 3 include two sets of link records (276, 250) respectively linking (250) item records (220) to demographics (282) in a many-to-many relation by the foreign keys demograpicID (252) and itemID (208)—and also linking (276) customer records (240) to demographics (282) by the foreign keys demograpicID (252) and customerID (206).

The exemplary data structures of FIG. 3 support selection of upsell items on the basis of demographic. That is, having received a purchase request and determined the weight of the inventory item identified for purchase in the purchase request, a merchant may select an upsell item not only for having a weight not greater than the difference between the weight of the item and the maximum shipping weight in the shipping weight range but also for having its itemID associated in a demographic link record (250) with a demographicID (252) that matches the demographicID of another item in the link records. A request to purchase a book on home gyms, for example, having a weight in a shipping weight range that leaves room in the range for another book weighing somewhat less than the purchased book, may be selected as an upsell item because, upon searching demographic link records with the itemID of the purchased book on home gyms, a demographic link record is found indicating that men whose ages are 25-35 purchase books about home gyms. Upon further search of the link records for other items having the same demographic, an itemID for the second book is found, and the second book is offered as an upsell item.

The exemplary data structures of FIG. 3 include records representing purchase histories (210). Each such record represents a previous purchase of an item or type of item by a customer. Each purchase history record (210) includes a customer ID (206), an item ID (208), and an item type (229). Readers of skill in the art will recognize that the purchase history records (210) form a many-to-many link between the item records (220) and the customer records (240) by the foreign keys customer ID (206), item ID (208), and item type (229).

The exemplary data structures of FIG. 3 support selection of upsell items on the basis of purchase history. That is, having received a purchase request and determined the weight of the inventory item identified for purchase in the purchase request, a merchant may select an upsell item not only for having a weight not greater than the difference between the weight of the item and the maximum shipping weight in the shipping weight range but also for having its itemID associated in a purchase history record (210) with the customer ID (206) of the customer identified in the purchase request (202, 206). A request to purchase a book on home gyms, for example, having a weight in a shipping weight range that leaves room in the range for another book weighing somewhat less than the purchased book, may be selected as an upsell item because, upon searching demographic link records with the itemID of the purchased book on home gyms, a purchase history record is found indicating that the customer identified on the purchase request also purchased a book on Zen Buddhism. The second book is a book on Zen Buddhism, selected as an upsell item and offered to the customer.

For further explanation, FIG. 4 sets forth a flow chart illustrating a method for weight based upselling that includes receiving (402) a purchase request (202) for an item from a customer (134) and determining (406) the weight of the item. In the method of FIG. 4, the weight of the item is read from an item record (220) in a data store (450) where the item record has a structure similar to the one illustrated at reference (220) on FIG. 3. That is, in the method of FIG. 4, the purchase request (202) may include an item identifier; an item record (220) may include data elements describing the item, including the weight of the item; and determining (406) a weight of the item may be carried out by selecting an item record (220) in dependence upon the item identifier and reading the weight of the item from the item record (220).

The method of FIG. 4 also includes identifying (408), in dependence upon the weight of the item, a shipping weight range and a shipping cost for the item. In the method of FIG. 4, the shipping weight range includes a maximum shipping weight, and the maximum shipping weight range is determined from a shipping cost table having a structure similar to the one illustrated for example at reference (230) on FIG. 3. The method of FIG. 4 also includes calculating (410) a difference between the weight of the item and the maximum shipping weight in the shipping weight range and selecting (414) an upsell item in dependence upon the difference between the weight of the item and the maximum shipping weight in the shipping weight range. The method of FIG. 4 also includes offering (416) the upsell item to the customer, including offering to ship both the item and the upsell item for only the identified shipping cost.

In the method of FIG. 4, selecting (414) an upsell item in dependence upon the difference between the weight of the item and the maximum shipping weight in the shipping weight range may be implemented by selecting an upsell item having a weight not greater than the difference between the weight of the item and the maximum shipping weight in the shipping weight range. In the method of FIG. 4, selecting (414) an upsell item in dependence upon the difference between the weight of the item and the maximum shipping weight in the shipping weight range may be carried out by selecting an upsell item having a weight not greater than the difference between the weight of the item and the maximum shipping weight in the shipping weight range and a type code (229 on FIG. 3) matching a type code associated with the item.

In the method of FIG. 4, selecting (414) an upsell item in dependence upon the difference between the weight of the item and the maximum shipping weight in the shipping weight range may be implemented by selecting an upsell item having a weight not greater than the difference between the weight of the item and the maximum shipping weight in the shipping weight range and at least one demographic code matching at least one demographic code (252 on FIG. 3) associated with the customer. In the method of FIG. 4, selecting (414) an upsell item in dependence upon the difference between the weight of the item and the maximum shipping weight in the shipping weight range may be implemented by selecting an upsell item having a weight not greater than the difference between the weight of the item and the maximum shipping weight in the shipping weight range and an item type matching an item type (229 on FIG. 3) associated with the customer through a purchase history (210 on FIG. 3).

Figure 5:
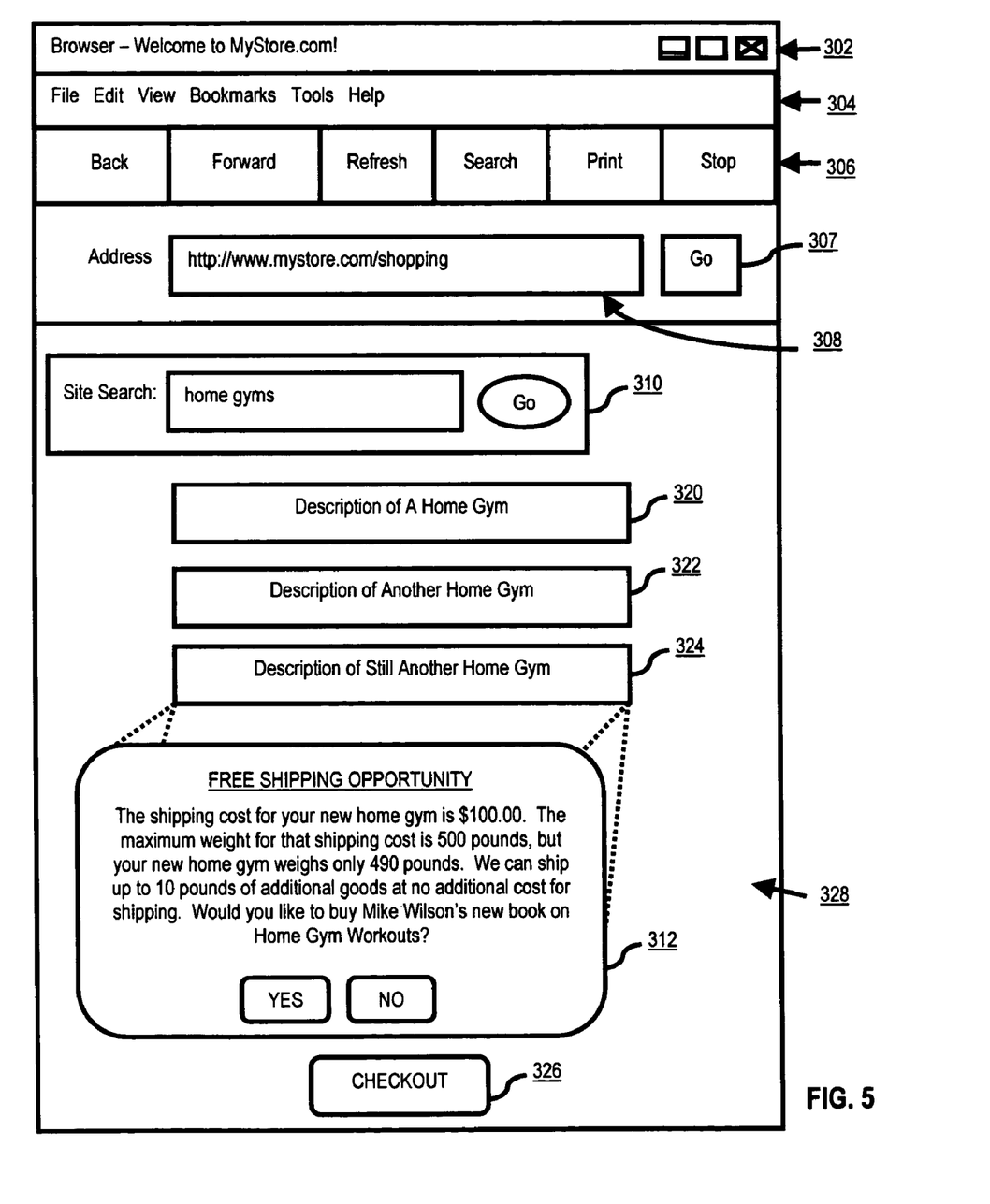
FIG. 5 depicts a graphical user interface ('GUI') of an exemplary computer software application program, more particularly, a browser.

For further explanation, FIG. 5 depicts a graphical user interface ('GUI') of an exemplary computer software application program, more particularly, in the example of FIG. 5, a browser. 'Browser,' as the term is used in this specification, generally means a web browser, a software application useful as a client-side data communications application in systems for weight based upselling according to embodiments of the present invention. Browsers typically can display text, graphics, audio, and video. Browsers are operative in any computer capable of data communications including web-enabled devices, wireless web-enabled devices, microcomputers, PDAs, laptops, and so on. Browsers in wireless web-enabled devices often are downsized browsers called "microbrowsers." The example of FIG. 5 is represented as a browser for convenience of explanation, not for limitation. In fact, many computer application programs may be improved according to embodiments of the present invention for use in weight based upselling, including, for example, instant messaging client applications, word processor programs, spreadsheet programs, database management tools, and, of course, browsers.

The browser of FIG. 5, as depicted, has been operated to point to a web site named "MyStore.com," as shown in the title bar of the browser display (302). The browser of FIG. 5 includes a GUI toolbar (306) with a Back button, a Forward button, and buttons for refreshing the display, searching, printing, and stopping web page retrievals. The browser of FIG. 5 also includes a horizontal menu (304) containing the menu items File, Edit, View, Bookmark (called 'Favorites' on some browsers), Tools, and Help. The exemplary browser of FIG. 5 includes an address bar (308), and invoking the Universal Resource Locator ('URL') identifying the displayed web page may be carried out by entering the URL in a browser's address bar (308) and invoking the browser's 'Go' button (307) next to the address bar (308) with a mouse click or keyboard carriage return requests the resource identified by the URL in the address bar, thereby 'navigating' the browser.

In this example, a customer has accessed the 'mystore' web site and navigated the browser to the network address which represents a shopping screen in a web site on a web server, an electronic commerce server, implemented to present and operate an online store with weight based upselling according to embodiments of the present invention. The web page so accessed has a site search feature (310) in which the customer entered the query 'home gyms.' The ecommerce server responded with three descriptions of home gyms (320, 322, 324), and the customer selected one (324) with a mouse click, thereby transmitting a purchase request to the ecommerce server and adding item (324) to an online shopping cart. The customer can review the contents of the online shopping cart, purchase items in the cart, and make payment arrangements and shipping arrangements by activating the CHECKOUT button (326) near the bottom of the browser screen.

The ecommerce server, upon receiving the purchase request, after the customer selected item (324), retrieved the weight of the item, that is, the third home gym, from its inventory item records, item records that may be implemented, for example, as described above regarding reference (220) on FIG. 3. The ecommerce server then reads the shipping cost for the item weight from a cost table similar to the one illustrated at reference (230) on FIG. 3, noting the maximum shipping weight for the weight range associated with the shipping cost in the shipping cost table and calculating the difference between the weight of the item and the maximum shipping weight in the shipping weight range.

The ecommerce server then selected an upsell item in dependence upon the difference between the weight of the item and the maximum shipping weight in the shipping weight range. That is, the ecommerce server selected an upsell item whose weight would not cause the combined weight of the home gym plus the upsell item to exceed the maximum shipping weight in the shipping weight range for the same shipping cost. In addition, the ecommerce server selected the item according to a demographic. In this example, the demographic is an expression of interest by the customer. That is, the server treats the customer's purchase request as an expression of interested in the item purchased for a home gym and looks up the item identifier for the item just purchased in a demographic link table like the one illustrated at reference (250) on FIG. 3. The server finds a demographic link record (250 on FIG. 3) having the same item ID (208) as the item purchased, reads the demographicID (252) off that link record, finds the next link record having the same demographicID, reads the item ID off that link record, returns to the item records (220), finds an item with that second item ID (which in this example is a book about home gym workouts), reads the description field (226) from the book item record, formulates the FREE SHIPPING OPPORTUNITY dialogue box shown at reference (312) on FIG. 5, and, by displaying the dialogue box (312), offers the upsell item, the book, to the customer, including offering to ship both the item and the upsell item for only the identified shipping cost.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A computer-implemented method for weight based upselling comprising the computer-implemented steps:

receiving a purchase request for an item from a customer including receiving a purchase request in an electronic commerce server through an electronic data communications medium, wherein the purchase request includes an item identifier:

determining, using a computer, a weight of the item including selecting an item record in dependence upon the item identifier, wherein the item record includes data elements describing the item, including the weight of the item, and reading the weight of the item from the item record;

identifying, using a computer in dependence upon the weight of the item, a shipping weight range and a shipping cost for the item, wherein the shipping weight range includes a maximum shipping weight;

calculating, using a computer, a difference between the weight of the item and the maximum shipping weight in the shipping weight range;

selecting, using a computer an upsell item in dependence upon the difference between the weight of the item and the maximum shipping weight in the shipping weight range including selecting an upsell item having a weight not greater than the difference between the weight of the item and the maximum shipping weight in the shipping weight range, a type code matching a type code associated with the item, at least one demographic code matching at least one demographic code associated with the customer, and an item type matching an item type associated with the customer through a purchase history; and offering, using a computer, the upsell item to the customer, including offering to ship both the item and the upsell item for only the identified shipping cost including offering the upsell item to the customer from the electronic commerce server through the electronic data communications medium.

2. The method of claim 1 wherein:

receiving a purchase request for an item further comprises receiving a purchase request in an electronic commerce server through an electronic data communications medium; and offering the upsell item to the customer further comprises offering the upsell item to the customer from the electronic commerce server through the electronic data communications medium.

3. The method of claim 1 wherein:

receiving a purchase request for an item further comprises receiving a purchase request for an item by telephone; and offering the upsell item to the customer further comprises offering the upsell item to the customer by telephone.

4. The method of claim 1 wherein:

the purchase request includes an item identifier;

determining a weight of the item further comprises selecting an item record in dependence upon the item identifier, wherein the item record includes data elements describing the item, including the weight of the item; and reading the weight of the item from the item record.

5. The method of claim 1 wherein:

selecting an upsell item in dependence upon the difference between the weight of the item and the maximum shipping weight in the shipping weight range further comprises selecting an upsell item having a weight not greater than the difference between the weight of the item and the maximum shipping weight in the shipping weight range.

6. The method of claim 1 wherein:

selecting an upsell item in dependence upon the difference between the weight of the item and the maximum shipping weight in the shipping weight range further comprises selecting an upsell item having:

a weight not greater than the difference between the weight of the item and the maximum shipping weight in the shipping weight range and a type code matching a type code associated with the item.

7. The method of claim 1 wherein:

selecting an upsell item in dependence upon the difference between the weight of the item and the maximum shipping weight in the shipping weight range further comprises selecting an upsell item having:

a weight not greater than the difference between the weight of the item and the maximum shipping weight in the shipping weight range and at least one demographic code matching at least one demographic code associated with the customer.

8. The method of claim 1 wherein:

selecting an upsell item in dependence upon the difference between the weight of the item and the maximum shipping weight in the shipping weight range further comprises selecting an upsell item having:

a weight not greater than the difference between the weight of the item and the maximum shipping weight in the shipping weight range; and an item type matching an item type associated with the customer through a purchase history.

* * * * *